(12) United States Patent
Oho

(10) Patent No.: US 10,996,654 B2
(45) Date of Patent: May 4, 2021

(54) SERVO CONTROLLER

(71) Applicant: FANUC CORPORATION, Yamanashi (JP)

(72) Inventor: Yusaku Oho, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/272,012

(22) Filed: Feb. 11, 2019

(65) Prior Publication Data

US 2019/0258229 A1 Aug. 22, 2019

(30) Foreign Application Priority Data

Feb. 20, 2018 (JP) .............................. JP2018-027921

(51) Int. Cl.
*G05B 19/4155* (2006.01)
(52) U.S. Cl.
CPC ..... *G05B 19/4155* (2013.01); *G05B 2219/34013* (2013.01)
(58) Field of Classification Search
CPC ............ G05B 19/4155; G05B 19/4184; G05B 19/414
USPC ........................................................ 318/639
See application file for complete search history.

(56) References Cited

U.S. PATENT DOCUMENTS

| 7,372,226 B2* | 5/2008 | Wiker | B23Q 11/0092 |
| | | | 318/275 |
| 9,902,063 B2* | 2/2018 | Furuya | B25J 9/1633 |
| 2008/0206382 A1* | 8/2008 | Yokoyama | B29C 45/844 |
| | | | 425/135 |
| 2008/0258671 A1* | 10/2008 | Iwashita | G05B 19/19 |
| | | | 318/632 |
| 2013/0095200 A1* | 4/2013 | Maruyama | B29C 45/768 |
| | | | 425/171 |

(Continued)

FOREIGN PATENT DOCUMENTS

| JP | 64-33605 | 2/1989 |
| JP | 09-016233 | 1/1997 |

(Continued)

OTHER PUBLICATIONS

Notification of Reasons for Refusal dated Jan. 28, 2020 in JP Patent Application No. 2018-027921.

*Primary Examiner* — Kawing Chan
(74) *Attorney, Agent, or Firm* — Wenderoth, Lind & Ponack, L.L.P.

(57) ABSTRACT

A servo controller includes: a servo control unit that controls a motor in a machine based on a position command; a position detection unit that detects the position of the motor; a positional error calculation unit that calculates a positional error between the position command and the position of the motor; a position abnormality detection unit that detects a position abnormality in the motor when the positional error is a first threshold or more; a load detection unit that detects a load torque on the motor; a load abnormality detection unit that detects a load abnormality in the motor when the load torque is a second threshold or more; an abnormality detection unit that detects an abnormality in the machine when the position abnormality or the load abnormality is detected; and a threshold change unit that changes the first or second threshold in response to the load state of the motor.

12 Claims, 3 Drawing Sheets

(56) References Cited

U.S. PATENT DOCUMENTS

| | | | |
|---|---|---|---|
| 2013/0156875 A1* | 6/2013 | Maruyama | B29C 45/84 425/150 |
| 2013/0169209 A1* | 7/2013 | Yoshida | G01D 5/3473 318/640 |
| 2014/0097859 A1* | 4/2014 | Matsumura | H02P 5/74 324/750.01 |
| 2015/0355607 A1* | 12/2015 | Nagaoka | G05B 13/042 318/561 |
| 2017/0015348 A1* | 1/2017 | Sasaki | B62D 5/049 |
| 2017/0242076 A1* | 8/2017 | Yoshiura | G01R 31/343 |
| 2017/0274572 A1* | 9/2017 | Maruyama | B29C 45/768 |
| 2017/0348855 A1* | 12/2017 | Abe | B25J 9/0051 |
| 2017/0357243 A1* | 12/2017 | Takayama | G06N 3/08 |
| 2018/0297731 A1* | 10/2018 | Hattori | B65B 57/10 |
| 2019/0166762 A1* | 6/2019 | Wu | A01D 41/141 |
| 2019/0317457 A1* | 10/2019 | Shinoda | G05B 13/0265 |

FOREIGN PATENT DOCUMENTS

| | | |
|---|---|---|
| JP | 10-143216 | 5/1998 |
| JP | 2001-150287 | 6/2001 |
| JP | 2002-175104 | 6/2002 |
| JP | 2007-072879 | 3/2007 |
| JP | WO2014/064926 | 9/2016 |

\* cited by examiner

SERVO CONTROLLER

This application is based on and claims the benefit of priority from Japanese Patent Application No. 2018-027921, filed on 20 Feb. 2018, the content of which is incorporated herein by reference.

BACKGROUND OF THE INVENTION

Field of the Invention

The present invention relates to a servo controller that controls a motor in a machine such as a machine tool or an industrial machine.

Related Art

In a machine such as a machine tool or an industrial machine, an abnormality such as an overload on a motor for driving a movable part may be caused by collision of the movable part with an obstacle (a tool, a workpiece, or on other object, for example). Patent documents 1 to 3 describe techniques relating to detect an abnormality in a machine such as a machine tool or an industrial machine based on a load torque on a motor.

Patent Document 1: Japanese Unexamined Patent Application, Publication No. H01-33605 (Japanese Unexamined Patent Application, Publication No. S64-33605)

Patent Document 2: Japanese Unexamined Patent Application, Publication No. 2001-150287

Patent Document 3: Japanese Unexamined Patent Application, Publication No. 2002-175104

SUMMARY OF THE INVENTION

Like the technique described in patent document 1, if an abnormality in a machine tool for machining is to be detected based on a load torque on a motor, for example, it becomes impossible in some cases to distinguish an abnormality due to the collision and machining disturbance during machining, causing difficulty in detecting the abnormality in the machine.

The present invention is intended to provide a servo controller capable of detecting an abnormality in a machine independently of the load state of a motor.

(1) A servo controller according to the present invention (servo controller 1 described later, for example) includes: a servo control unit (servo control unit 10 described later, for example) that controls a motor (motor 3 described later, for example) in a machine based on a position command; a position detection unit (position detection unit 20 described later, for example) that detects the position of the motor; a positional error calculation unit (positional error calculation unit 22 described later, for example) that calculates a positional error between the position command and the position of the motor detected by the position detection unit; a position abnormality detection unit (position abnormality detection unit 24 described later, for example) that detects a position abnormality in the motor when the positional error calculated by the positional error calculation unit is a first threshold or more; a load detection unit (load detection unit 30 described later, for example) that detects a load torque on the motor; a load abnormality detection unit (load abnormality detection unit 32 described later, for example) that detects a load abnormality in the motor when the load torque detected by the load detection unit is a second threshold or more; an abnormality detection unit (abnormality detection unit 50 described later, for example) that detects an abnormality in the machine when the position abnormality detection unit detects the position abnormality in the motor or when the load abnormality detection unit detects the load abnormality in the motor; and a threshold change unit (threshold change unit 40 described later, for example) that changes at least one of the first threshold and the second threshold in response to the load state of the motor.

(2) In the servo controller described in (1), when the load state of the motor is a heavy-load state, the threshold change unit may increase at least the second threshold, compared to the second threshold determined when the load state of the motor is a no-load state or a light-load state.

(3) In the servo controller described in (1) or (2), the threshold change unit may acquire an operation program for the motor from a higher-order controller, and estimate the load state of the motor based on information indicated by the operation program.

(4) In the servo controller described in any one of (1) to (3), when the position abnormality detection unit detects the position abnormality in the motor, the position abnormality detection unit may output a position abnormality level responsive to the magnitude of the positional error, when the load abnormality detection unit detects the load abnormality in the motor, the load abnormality detection unit may output a load abnormality level responsive to the magnitude of the load torque, and the abnormality detection unit may detect the abnormality in the machine based on the position abnormality level output from the position abnormality detection unit and the load abnormality level output from the load abnormality detection unit.

(5) In the servo controller described in (4), the threshold change unit may control the position abnormality detection unit or the load abnormality detection unit so as to invalidate one of output of the position abnormality level and output of the load abnormality level in response to the load state of the motor.

(6) In the servo controller described in (5), the threshold change unit may control the load abnormality detection unit so as to invalidate output of the load abnormality level when the load state of the motor is a heavy load state, and the threshold change unit may control the position abnormality detection unit so as to invalidate the position abnormality level when the load state of the motor is a no-load state or a light-load state.

(7) In the servo controller described in any one of (4) to (6), when the total sum of the position abnormality level and the load abnormality level is a third threshold or more, the abnormality detection unit may issue a notification to stop the operation of the motor.

(8) In the servo controller described in any one of (4) to (7), the position abnormality level may be a difference between the positional error and the first threshold, and the load abnormality level may be a difference between the load torque and the second threshold.

(9) In the servo controller described in any one of (1) to (8), the positional error calculation unit may estimate an estimation position of the motor by taking delay by the servo control unit from the position command into consideration, and calculate an error between the estimation position and the position of the motor detected by the position detection unit as the positional error.

The present invention can provide a servo controller capable of detecting an abnormality in a machine independently of the load state of a motor.

DETAILED DESCRIPTION OF THE INVENTION

Figure 1:
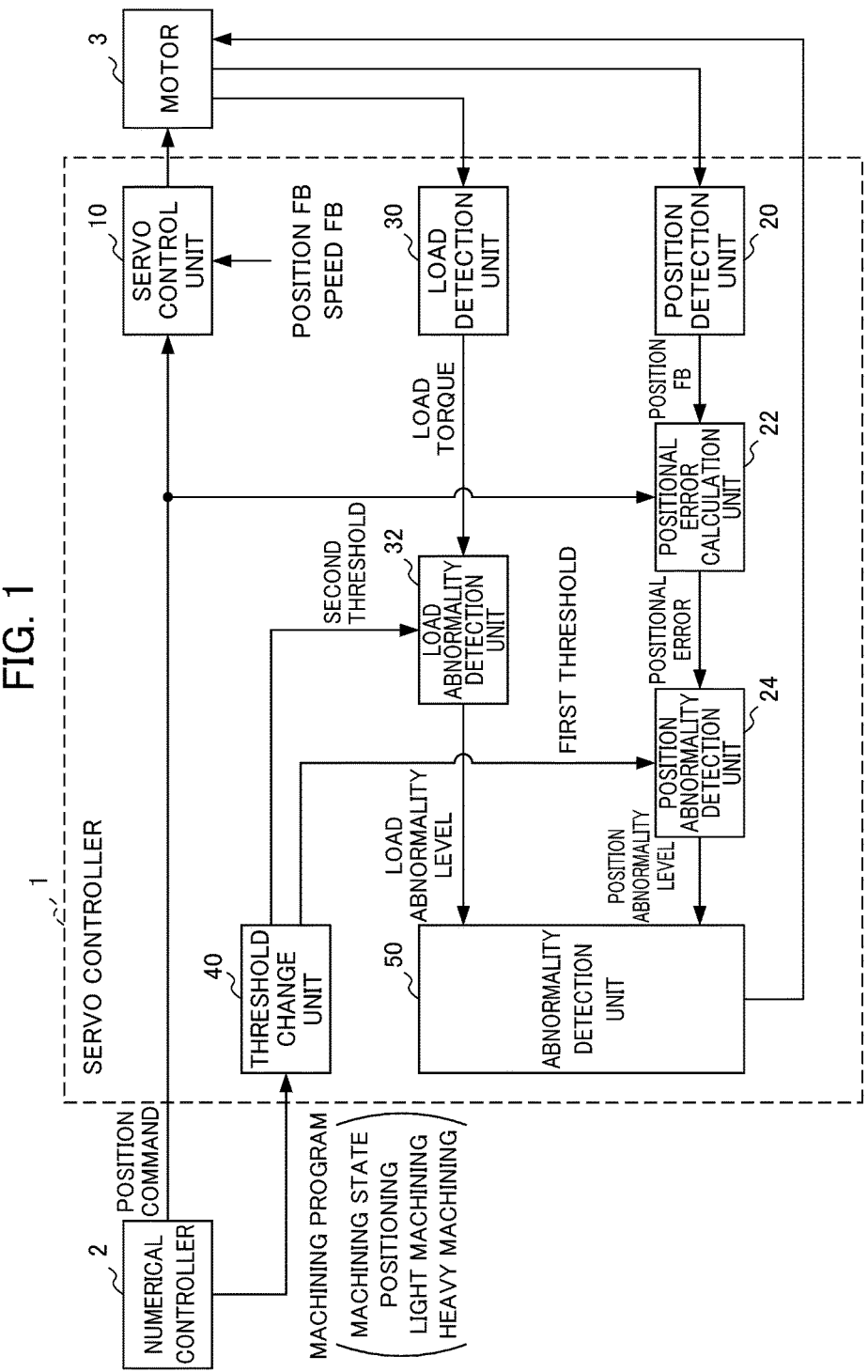
FIG. 1 shows the configuration of a servo controller according to an embodiment.

An example of an embodiment of the present invention will be described below by referring to the accompanying drawings. In the drawings, corresponding or similar parts are identified by the same sign.

FIG. 1 shows the configuration of a servo controller according to the embodiment. A servo controller 1 shown in FIG. 1 is to control a motor 3 for feed axis control for driving a movable part in a machine tool for machining, for example. The servo controller 1 controls the motor 3 by following a position command based on a machining program in a numerical controller 2 as a higher-order device. The servo controller 1 includes a servo control unit 10, a position detection unit 20, a positional error calculation unit 22, a position abnormality detection unit 24, a load detection unit 30, a load abnormality detection unit 32, a threshold change unit 40, and an abnormality detection unit 50.

The servo control unit 10 calculates a driving current for the motor 3 by executing position control, speed control, and current control using PI control, for example, based on a position command from the numerical controller 2. As an example, the servo control unit 10 calculates a speed command based on a positional error between the position command and a position feedback (position FB) detected by an encoder provided at the motor 3 (position control), calculates a torque command for the motor 3 based on the calculated speed command and a speed feedback (speed FB) detected by the encoder (speed control), and calculates a driving current for the motor 3 based on the calculated torque command (current control), for example.

The position detection unit 20 detects the rotation position of the motor 3. The rotation position of the motor 3 corresponds to the position of the movable part in the machine tool. The detected position is used as the position feedback (position FB). The position detection unit 20 is the encoder provided at the motor 3, for example. The encoder further detects the rotation speed of the motor 3. The rotation speed of the motor 3 corresponds to the feed speed of the movable part in the machine tool. The detected speed is used as the foregoing speed feedback (speed FB).

The positional error calculation unit 22 calculates a positional error between a position command from the numerical controller 2 and the position feedback detected by the position detection unit 20.

The position abnormality detection unit 24 compares the positional error calculated by the positional error calculation unit 22 and a first threshold for detecting a position abnormality in the motor 3, and detects a position abnormality in the motor 3. When the positional error is the first threshold or more, the position abnormality detection unit 24 outputs a position abnormality level responsive to the magnitude of the positional error. For example, the position abnormality level is a difference between the positional error and the first threshold (see FIG. 3). Alternatively, the position abnormality level may be the positional error itself.

The load detection unit 30 detects a load torque on the motor 3. The load detection unit 30 is a servo amplifier to acquire a current feedback from the motor 3, for example.

The load abnormality detection unit 32 compares the load torque detected by the load detection unit 30 and a second threshold for detecting a load abnormality in the motor 3, and detects a load abnormality in the motor 3. When the load torque is the second threshold or more, the load abnormality detection unit 32 outputs a load abnormality level responsive to the magnitude of the load torque. For example, the load abnormality level is a difference between the load torque and the second threshold (see FIG. 2). Alternatively, the load abnormality level may be the load torque itself.

The threshold change unit 40 acquires a machining program (operation program for the motor 3) from the numerical controller 2, and estimates a machining state (the load state of the motor 3) based on information indicated by the machining program. For example, the machining program indicates information such as a feed speed. The threshold change unit 40 changes at least one of the first threshold and the second threshold in response to the machining state.

When a machining state is a heavy machining state (heavy-load state), for example, the threshold change unit 40 at least increases the second threshold, compared to the second threshold determined when the machining state is a positioning state (no-load state) or a light machining state (light-load state).

The abnormality detection unit 50 detects an abnormality in the machine based on the position abnormality level output from the position abnormality detection unit 24 and the load abnormality level output from the load abnormality detection unit 32. When the total sum of the position abnormality level and the load abnormality level is a third threshold for detecting an abnormality in the machine or more, for example, the abnormality detection unit 50 detects an abnormality in the machine. The abnormality detection unit 50 issues a notification to stop the operation of the motor 3 when an abnormality in the machine is detected.

The servo controller 1 is configured using an operation processor such as a digital signal processor (DSP) or a field-programmable gate array (FPGA), for example. The servo controller 1 has various functions to be fulfilled by execution of predetermined software (program) stored in a storage unit (not shown). The various functions of the servo controller 1 may be fulfilled by cooperative work by hardware and software, or only by hardware (electronic circuit).

Figure 2:
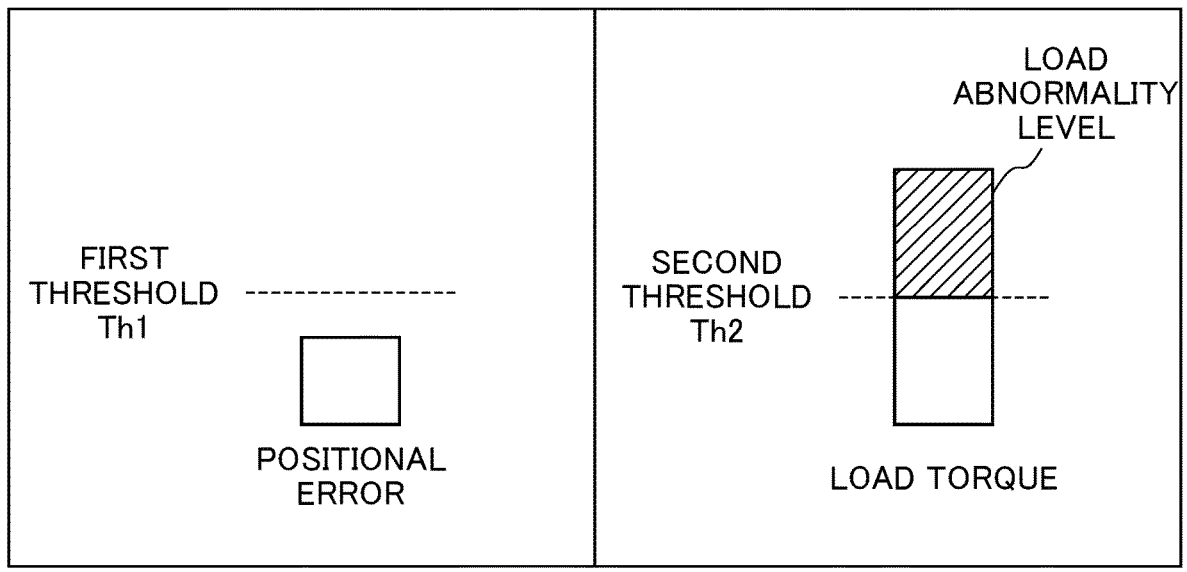
FIG. 2 is a schematic view showing abnormality detecting operation performed by the servo controller according to the embodiment when a machining state is a positioning state or a light machining state.
Figure 3:
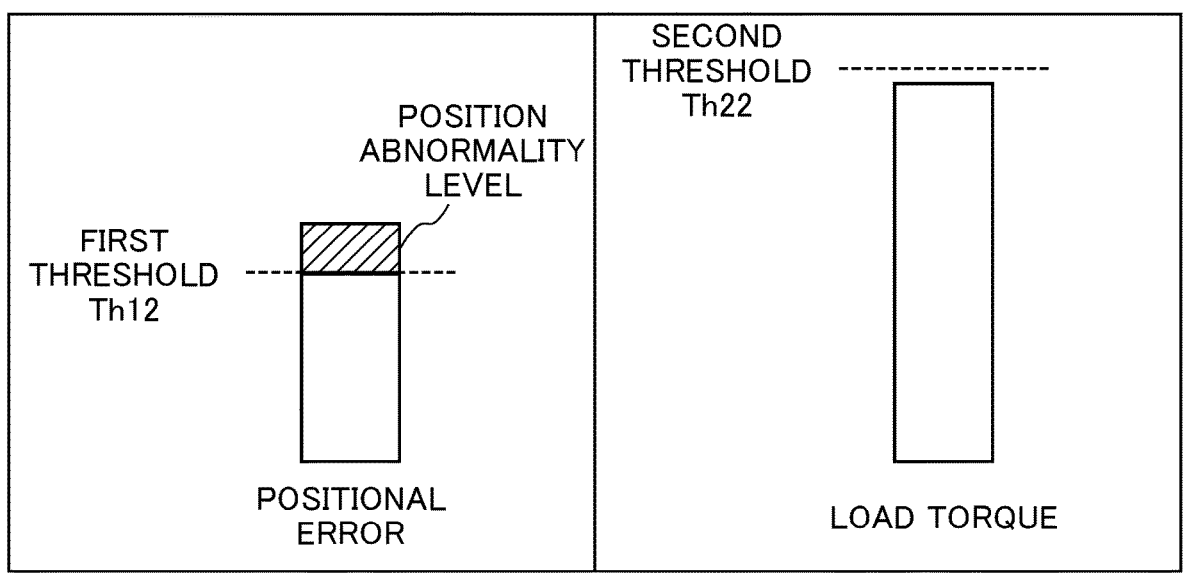
FIG. 3 is a schematic view showing abnormality detecting operation performed by the servo controller according to the embodiment when a machining state is a heavy machining state.

Abnormality detecting operation performed by the servo controller 1 of the embodiment will be described next by referring to FIGS. 2 and 3. FIG. 2 is a schematic view showing the abnormality detecting operation performed by the servo controller 1 when a machining state is a positioning state or a light machining state. FIG. 3 is a schematic view showing the abnormality detecting operation performed by the servo controller 1 when a machining state is a heavy machining state.

(Positioning State or Light Machining State)

In a positioning state or a light machining state, machining disturbance is comparatively small. Thus, as shown in FIG. 2, to detect an abnormality such as collision of the machine by detecting a load abnormality in the motor 3 based on a load torque, the threshold change unit 40 sets the first threshold at Th1 and the second threshold at Th2. In FIG. 2, a positional error is less than the first threshold Th1. Thus, the position abnormality detection unit 24 does not detect a position abnormality in the motor 3 and does not output a position abnormality level. Meanwhile, a load torque is the second threshold Th2 or more. Thus, the load abnormality detection unit 32 detects a load abnormality in the motor 3 and outputs a load abnormality level.

When the total sum of the position abnormality level output from the position abnormality detection unit 24 and the load abnormality level output from the load abnormality detection unit 32 is the third threshold or more, the abnormality detection unit 50 detects an abnormality in the machine. In this case, the abnormality detection unit 50 issues a notification to stop the operation of the motor 3. In response to this notification, the motor 3 stops its operation.

(Heavy Machining State)

In a heavy machining state, machining disturbance is comparatively large. Thus, as shown in FIG. 3, to detect an abnormality such as collision of the machine by detecting a position abnormality in the motor 3 based on a positional error, the threshold change unit 40 changes the second threshold to Th22 comparatively larger than Th2. In the embodiment, the threshold change unit 40 also changes the first threshold to Th12 comparatively larger than Th1. However, the first threshold may remain unchanged. In FIG. 3, a positional error is the first threshold Th1 or more. Thus, the position abnormality detection unit 24 detects a position abnormality in the motor 3 and outputs a position abnormality level. Meanwhile, a load torque is less than the second threshold Th2. Thus, the load abnormality detection unit 32 does not detect a load abnormality in the motor 3 and does not output a load abnormality level.

When the total sum of the position abnormality level output from the position abnormality detection unit 24 and the load abnormality level output from the load abnormality detection unit 32 is the third threshold or more, the abnormality detection unit 50 detects an abnormality in the machine. In this case, the abnormality detection unit 50 issues a notification to stop the operation to the motor 3. In response to this notification, the motor 3 stops its operation.

As described above, in the servo controller 1 of the embodiment, an abnormality detection method is switched in response to a machining state (the load state of the motor 3). More specifically, in each of a positioning state (no-load state) and a light machining state (light-load state) in which machining disturbance is comparatively small, the servo controller 1 detects an abnormality such as collision of a machine by detecting a load abnormality in the motor 3 based on an actual load torque. Meanwhile, in a heavy machining state (heavy-load state) in which machining disturbance is comparatively large, the servo controller 1 detects an abnormality such as collision of the machine by detecting a position abnormality in the motor 3 based on a positional error between an actual position and a position command. As a result, in any machining state (in any load state of the motor 3) such as a heavy machining state in which machining disturbance is comparatively large, for example, an abnormality such as collision of the machine can be detected.

In the servo controller 1 of the embodiment, the first threshold for detecting a position abnormality in the motor 3 and the second threshold for detecting a load abnormality in the motor 3 are set at arbitrary values. This makes it possible to switch between the position abnormality detection and the load abnormality detection steplessly.

In the servo controller 1 of the embodiment, a notification to stop the motor 3 is issued without being passed through a higher-order device such as the numerical controller 2. This makes it possible to stop the motor 3 more promptly on the occurrence of the machine abnormality.

(First Modification)

In the foregoing embodiment, the first threshold for detecting a position abnormality in the motor 3 and the second threshold for detecting a load abnormality in the motor 3 are changed to switch between these two abnormality detection methods. Alternatively, a switch between the two abnormality detection methods for detecting a position abnormality in the motor 3 and for detecting a load abnormality in the motor 3 may be made by invalidating one of output of a position abnormality level about the motor 3 and output of a load abnormality level about the motor 3.

Figure 4:
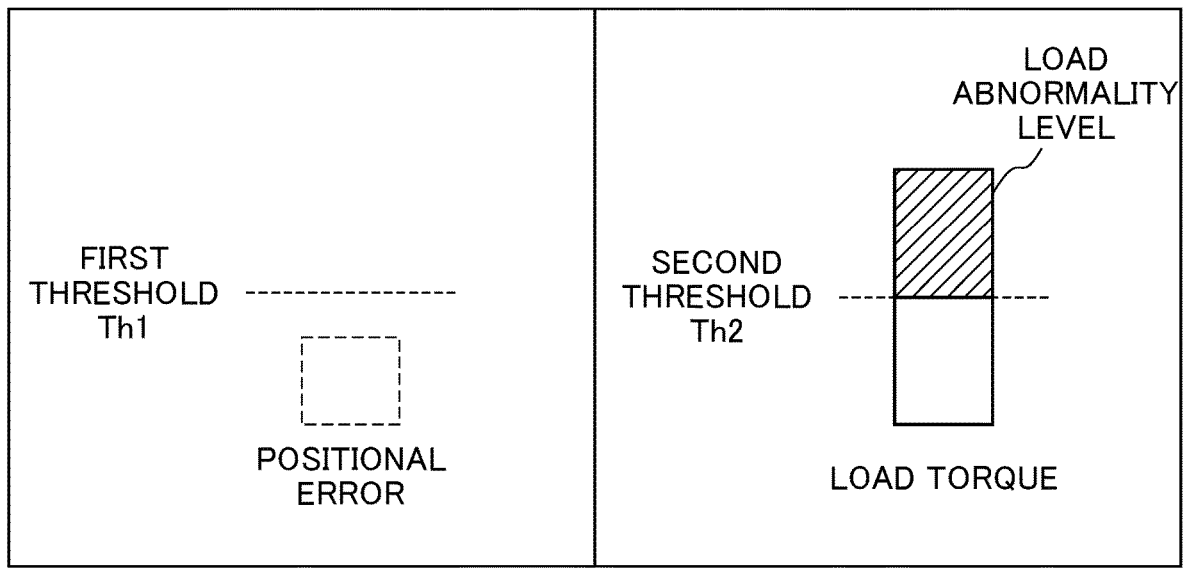
FIG. 4 is a schematic view showing abnormality detecting operation performed by a servo controller according to a modification of the embodiment when a machining state is a positioning state or a light machining state.
Figure 5:
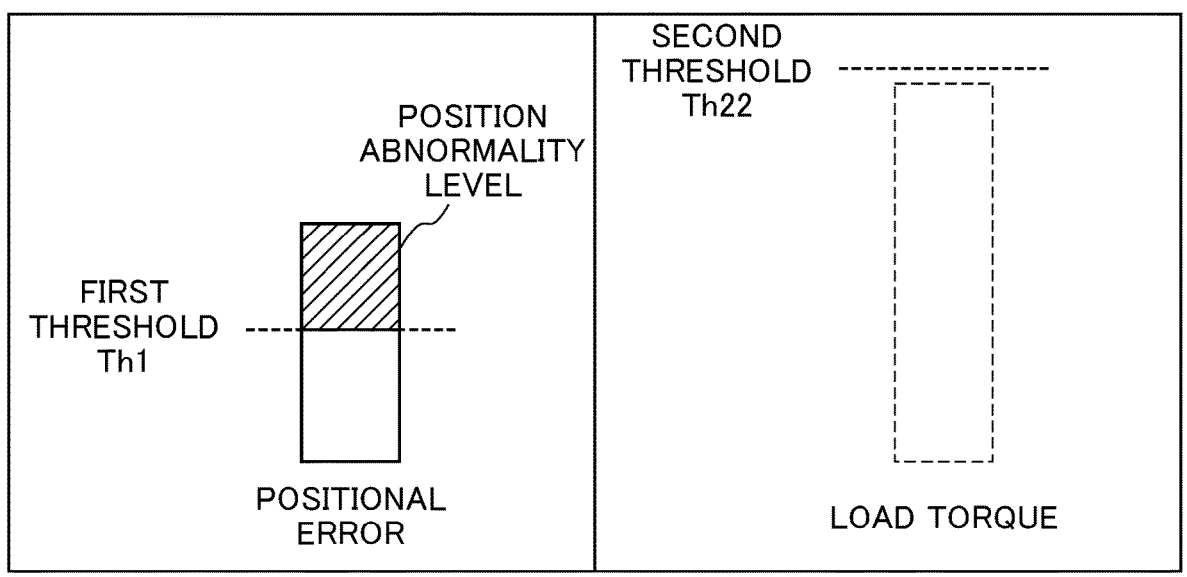
FIG. 5 is a schematic view showing abnormality detecting operation performed by the servo controller according to the modification of the embodiment when a machining state is a heavy machining state.

In a first modification, the threshold change unit 40 controls the position abnormality detection unit 24 or the load abnormality detection unit 32 so as to invalidate one of output of a position abnormality level and output of a load abnormality level in response to a machining state. When a machining state is a positioning state or a light machining state, for example, the threshold change unit 40 controls the position abnormality detection unit 24 so as to invalidate a position abnormality level, as shown in FIG. 4. When a machining state is a heavy machining state, the threshold change unit 40 controls the load abnormality detection unit 32 so as to invalidate output of a load abnormality level, as shown in FIG. 5.

(Second Modification)

In the foregoing embodiment, a switch is made between the two abnormality detection methods for detecting a position abnormality in the motor 3 and for detecting a load abnormality in the motor 3. Alternatively, the two abnormality detection methods for detecting a position abnormality in the motor 3 and for detecting a load abnormality in the motor 3 may be given different weights. By doing so, these two abnormality detection methods, specifically, a position abnormality level in the motor 3 and a load abnormality level in the motor 3 may be used in combination.

For example, in a second modification, the first threshold and the second threshold are set in such a manner that, independently of whether a machining state is a positioning state or a light machining state, or whether the machining state is a heavy machining state, both a position abnormality level and a load abnormality level are output. In this case, the abnormality detection unit 50 may detect an abnormality in the machine when the total sum of the position abnormality level and the load abnormality level is the third threshold or more.

(Third Modification)

In the foregoing embodiment, a position abnormality in the motor 3 is detected based on a positional error between a position command and a position detected value. Alternatively, the position command may be replaced by a position estimation value determined by taking control delay by the servo control unit 10 into consideration.

In a third modification, the positional error calculation unit 22 estimates an estimation position of the motor 3 by taking control delay (first-order delay, for example) by the servo control unit 10 from a position command into consideration. The positional error calculation unit 22 calculates an error between the estimation position and the position of the motor 3 detected by the position detection unit 20 as a positional error (dynamic error monitoring).

To detect an abnormality by monitoring a positional error, a detection threshold is generally set using a positional error as a basis that might occur during rapid traverse in a positioning state. Hence, the threshold is set at a large value. The positional error becomes smaller in actual machining. This unfortunately causes detection delay on the occurrence of an abnormality. In this regard, in the third modification, an ideal position is estimated by taking control delay (first-order delay, for example) by the servo control unit 10 into consideration, and the amount of error of a detected position from the estimation position is monitored. This makes it possible to detect a position abnormality in the motor 3 more promptly.

In the third modification, a position abnormality in the motor 3 is determined using a positional error between the ideal estimation position and the detected position, in addition to a load torque. When machining disturbance is large, a load torque assumes a large value even in a normal state. Hence, an abnormality such as collision of the machine cannot be determined. In this regard, in the third modification, a positional error between the ideal estimation position and the detected position is monitored. This makes it possible to detect an abnormality in the machine such as an unexpected collision occurring in a transient state.

(Fourth Modification)

In the foregoing embodiment, a position abnormality level and a load abnormality level are calculated to detect an abnormality in the machine. Alternatively, calculation of a position abnormality level and a load abnormality level may be omitted.

In a fourth modification, when a positional error calculated by the positional error calculation unit 22 is the first threshold or more, the position abnormality detection unit 24 detects a position abnormality in the motor 3, and outputs information indicating the position abnormality to the abnormality detection unit 50. When a load torque detected by the load detection unit 30 is the second threshold or more, the load abnormality detection unit 32 detects a load abnormality in the motor 3, and outputs information indicating the load abnormality to the abnormality detection unit 50. The abnormality detection unit 50 detects an abnormality in the machine based on the information indicating the position abnormality output from the position abnormality detection unit 24 and the information indicating the load abnormality output from the load abnormality detection unit 32. In this way, the abnormality detection unit 50 detects an abnormality in the machine when the position abnormality detection unit 24 detects the position abnormality in the motor 3, or when the load abnormality detection unit 32 detects the load abnormality in the motor 3.

The present invention should not be limited to the embodiment described above, but various changes and modifications are applicable to the present invention. In the example described in the foregoing embodiment, the servo controller 1 that controls the motor 3 in a machine tool for machining is shown as an example. However, the features of the present invention should not be limited to this servo controller but the present invention is applicable to servo controllers that control motors in various types of machine in industrial machines, various types of robots, etc.

EXPLANATION OF REFERENCE NUMERALS

1 Servo controller
2 Numerical controller
3 Motor
10 Servo control unit
20 Position detection unit
22 Positional error calculation unit
24 Position abnormality detection unit
30 Load detection unit
32 Load abnormality detection unit
40 Threshold change unit
50 Abnormality detection unit

What is claimed is:

1. A servo controller comprising: a servo control unit that controls a motor in a machine based on a position command; a position detection unit that detects the position of the motor; a positional error calculation unit that calculates a positional error between the position command and the position of the motor detected by the position detection unit; a position abnormality detection unit that detects a position abnormality in the motor when the positional error calculated by the positional error calculation unit is a first threshold or more; a load detection unit that detects a load torque on the motor; a load abnormality detection unit that detects a load abnormality in the motor when the load torque detected by the load detection unit is a second threshold or more; an abnormality detection unit that detects an abnormality in the machine when the position abnormality detection unit detects the position abnormality in the motor or when the load abnormality detection unit detects the load abnormality in the motor; and a threshold change unit that changes at least one of the first threshold and the second threshold in response to a load state of the motor, wherein when the position abnormality detection unit detects the position abnormality in the motor, the position abnormality detection unit outputs a position abnormality level responsive to the magnitude of the positional error, when the load abnormality detection unit detects the load abnormality in the motor, the load abnormality detection unit outputs a load abnormality level responsive to the magnitude of the load torque, and the abnormality detection unit detects the abnormality in the machine based on the position abnormality level output from the position abnormality detection unit and the load abnormality level output from the load abnormality detection unit, and issues a notification to stop the operation of the motor when abnormality is detected, wherein the threshold change unit controls the position abnormality detection unit or the load abnormality detection unit so as to invalidate one of output of the position abnormality level and output of the load abnormality level in response to the load state of the motor, wherein the threshold change unit controls the load abnormality detection unit so as to invalidate output of the load abnormality level when the load state of the motor is a heavy load state, and the threshold change unit controls the position abnormality detection unit so as to invalidate the position abnormality level when the load state of the motor is a no-load state or a light-load state.

2. The servo controller according to claim 1, wherein when the load state of the motor is a heavy-load state, the threshold change unit increases at least the second threshold, compared to the second threshold determined when the load state of the motor is a no-load state or a light-load state.

3. The servo controller according to claim 1, wherein the threshold change unit acquires an operation program for the motor from a higher-order controller, and estimates the load state of the motor based on information indicated by the operation program.

4. The servo controller according to claim 1, wherein the positional error calculation unit estimates an estimation position of the motor by taking delay by the servo control unit from the position command into consideration, and calculates an error between the estimation position and the position of the motor detected by the position detection unit as the positional error.

5. A servo controller comprising: a servo control unit that controls a motor in a machine based on a position command;
a position detection unit that detects the position of the motor;
a positional error calculation unit that calculates a positional error between the position command and the position of the motor detected by the position detection unit;
a position abnormality detection unit that detects a position abnormality in the motor when the positional error calculated by the positional error calculation unit is a first threshold or more;
a load detection unit that detects a load torque on the motor;
a load abnormality detection unit that detects a load abnormality in the motor when the load torque detected by the load detection unit is a second threshold or more;
an abnormality detection unit that detects an abnormality in the machine when the position abnormality detection unit detects the position abnormality in the motor or when the load abnormality detection unit detects the load abnormality in the motor; and
a threshold change unit that changes at least one of the first threshold and the second threshold in response to a load state of the motor,
wherein when the position abnormality detection unit detects the position abnormality in the motor, the position abnormality detection unit outputs a position abnormality level responsive to the magnitude of the positional error,
when the load abnormality detection unit detects the load abnormality in the motor, the load abnormality detection unit outputs a load abnormality level responsive to the magnitude of the load torque, and
the abnormality detection unit detects the abnormality in the machine based on the position abnormality level output from the position abnormality detection unit and the load abnormality level output from the load abnormality detection unit
wherein when the total sum of the position abnormality level and the load abnormality level is a third threshold or more, the abnormality detection unit issues a notification to stop the operation to the motor.

6. The servo controller according to claim 5, wherein when the load state of the motor is a heavy-load state, the threshold change unit increases at least the second threshold, compared to the second threshold determined when the load state of the motor is a no-load state or a light-load state.

7. The servo controller according to claim 5, wherein the threshold change unit acquires an operation program for the motor from a higher-order controller, and estimates the load state of the motor based on information indicated by the operation program.

8. The servo controller according to claim 5, wherein the positional error calculation unit estimates an estimation position of the motor by taking delay by the servo control unit from the position command into consideration, and calculates an error between the estimation position and the position of the motor detected by the position detection unit as the positional error.

9. A servo controller comprising: a servo control unit that controls a motor in a machine based on a position command; a position detection unit that detects the position of the motor; a positional error calculation unit that calculates a positional error between the position command and the position of the motor detected by the position detection unit; a position abnormality detection unit that detects a position abnormality in the motor when the positional error calculated by the positional error calculation unit is a first threshold or more; a load detection unit that detects a load torque on the motor; a load abnormality detection unit that detects a load abnormality in the motor when the load torque detected by the load detection unit is a second threshold or more, an abnormality detection unit that detects an abnormality in the machine when the position abnormality detection unit detects the position abnormality in the motor or when the load abnormality detection unit detects the load abnormality in the motor; and a threshold change unit that changes at least one of the first threshold and the second threshold in response to a load state of the motor, wherein when the position abnormality detection unit detects the position abnormality in the motor, the position abnormality detection unit outputs a position abnormality level responsive to the magnitude of the positional error, when the load abnormality detection unit detects the load abnormality in the motor, the load abnormality detection unit outputs a load abnormality level responsive to the magnitude of the load torque, and the abnormality detection unit detects the abnormality in the machine based on the position abnormality level output from the position abnormality detection unit and the load abnormality level output from the load abnormality detection unit, and issues a notification to stop the operation of the motor when abnormality is detected, wherein the position abnormality level is a difference between the positional error and the first threshold, and the load abnormality level is a difference between the load torque and the second threshold.

10. The servo controller according to claim 9, wherein when the load state of the motor is a heavy-load state, the threshold change unit increases at least the second threshold, compared to the second threshold determined when the load state of the motor is a no-load state or a light-load state.

11. The servo controller according to claim 9, wherein the threshold change unit acquires an operation program for the motor from a higher-order controller, and estimates the load state of the motor based on information indicated by the operation program.

12. The servo controller according to claim 9, wherein the positional error calculation unit estimates an estimation position of the motor by taking delay by the servo control unit from the position command into consideration, and calculates an error between the estimation position and the position of the motor detected by the position detection unit as the positional error.

* * * * *